US008819316B2

(12) United States Patent
Cho

(10) Patent No.: US 8,819,316 B2
(45) Date of Patent: Aug. 26, 2014

(54) TWO-WAY RAID CONTROLLER WITH PROGRAMMABLE HOST INTERFACE FOR A SEMICONDUCTOR STORAGE DEVICE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 118 days.

(21) Appl. No.: 13/165,102

(22) Filed: Jun. 21, 2011

(65) Prior Publication Data
US 2012/0331338 A1    Dec. 27, 2012

(51) Int. Cl.
*G06F 13/14*    (2006.01)
*G06F 3/06*    (2006.01)

(52) U.S. Cl.
CPC ............ *G06F 3/0658* (2013.01); *G60F 3/0689* (2013.01)
USPC ............................. 710/74; 710/305; 711/114

(58) Field of Classification Search
CPC .................................................. G06G 3/0658
USPC ..................................... 710/74, 305; 711/114
See application file for complete search history.

(56) References Cited

U.S. PATENT DOCUMENTS

| | | | |
|---|---|---|---|
| 6,449,677 B1 * | 9/2002 | Olarig et al. .................. | 710/305 |
| 7,805,564 B2 * | 9/2010 | Matsunami et al. .......... | 711/114 |
| 2005/0005063 A1 * | 1/2005 | Liu et al. ....................... | 711/112 |
| 2006/0136666 A1 * | 6/2006 | Pang et al. .................... | 711/114 |
| 2009/0300278 A1 | 12/2009 | Kruger | |
| 2010/0332691 A1 | 12/2010 | Yoshida | |
| 2011/0153903 A1 * | 6/2011 | Hinkle et al. ................. | 710/313 |
| 2011/0179198 A1 | 7/2011 | Cho | |

FOREIGN PATENT DOCUMENTS

| | | |
|---|---|---|
| JP | 2011-008401 A | 1/2011 |
| KR | 10-0928438 B1 | 11/2009 |
| KR | 10-2010-0036528 A | 4/2010 |

OTHER PUBLICATIONS

Notice of Allowance dated Oct. 15, 2012 in Korean Application No. 10-2012-0065924.

* cited by examiner

*Primary Examiner* — Ernest Unelus
(74) *Attorney, Agent, or Firm* — Saliwanchik, Lloyd & Eisenschenk

(57) ABSTRACT

Provided is a two-way RAID controlled storage device of a serial attached small computer system interface/serial advanced technology attachment (PCI-Express) type, which provides data storage/reading services through a PCI-Express interface. The RAID controller typically comprises multiple sets of RAID equipment coupled to one another via a hardware host connect, an adaptive host interface controller, a host connect controller, a two-way RAID controller, a disk connect controller, an adaptive disk mount controller, and a hardware disk connect. Coupled to the hardware disk connect are a set of DDR, SSD memory disk units. Further, each set of RAID equipment typically comprises a programmable host interface unit, a disk controller, a high speed host interface, a disk monitoring unit, a disk plug and play controllers, and a programmable disk mount.

18 Claims, 5 Drawing Sheets

TWO-WAY RAID CONTROLLER WITH PROGRAMMABLE HOST INTERFACE FOR A SEMICONDUCTOR STORAGE DEVICE

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010. This application is also related in some aspects to commonly-owned, co-pending application Ser. No. 12/763,701 entitled RAID CONTROLLED SEMICONDUCTOR STORAGE DEVICE", filed on Apr. 20, 2010. This application is related in some aspects to commonly-owned, co-pending application Ser. No. 12/763,688, entitled RAID CONTROLLER FOR A SEMICONDUCTOR STORAGE DEVICE", filed on Apr. 20, 2010. This application is related in some aspects to commonly-owned, co-pending application Ser. No. 12/848,348, entitled RAID CONTROLLER HAVING MULTI PCI BUS SWITCHING", filed on Aug. 2, 2010.

FIELD OF THE INVENTION

The present invention relates to a two-way RAID controller for a semiconductor storage device of a serial attached small computer system interface/serial advanced technology. Specifically, the present invention relates to a storage device of a PCI-Express type for providing data storage/reading services through a PCI-Express interface.

BACKGROUND OF THE INVENTION

As the need for more computer storage grows, more efficient solutions are being sought. As is know, there are various hard disk solutions that stores/reads data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing are in that the performance of the memory disk cannot be property utilized.

SUMMARY OF THE INVENTION

Provided is a two-way RAID controlled storage device of a serial attached small computer system interface/serial advanced technology attachment (PCI-Express) type, which provides data storage/reading services through a PCI-Express interface. The RAID controller typically comprises multiple sets of RAID equipment coupled to one another via a hardware host connect, an adaptive host interface controller, a host connect controller, a two-way RAID controller, a disk connect controller, an adaptive disk mount controller, and a hardware disk connect. Coupled to the hardware disk connect are a set of DDR, SSD memory disk units. Further, each set of RAID equipment typically comprises a programmable host interface unit, a disk controller, a high speed host interface, a disk monitoring unit, a disk plug and play controllers, and a programmable disk mount.

A first aspect of the present invention provides a RAID controller with programmable host interface for a semiconductor storage device (SSD), comprising: a first set of RAID equipment comprising a first programmable host interface, first a disk controller, a first high speed host interface, a first programmable disk mount, a first disk monitoring unit, and a first disk plug and play controller; a second set of RAID equipment comprising a second programmable host interface, second a disk controller, a second high speed host interface, a second programmable disk mount, a second disk monitoring unit, and a second disk plug and play controller; and a set of control equipment coupling the first set of RAID equipment to the second set of RAID equipment, the set of control equipment comprising a hardware host connect, an adaptive host interface controller, a host connect controller, a two-way RAID controller, a disk connect controller, and a hardware disk connect; and a set of SSD memory disk units coupled to the hardware disk connect, the set of SSD memory disk units comprising a set of volatile semiconductor memories.

A second aspect of the present invention provides a RAID controller with programmable host interface for a semiconductor storage device (SSD), comprising: a plurality of sets of RAID equipment, each of the plurality of RAID equipment comprising a programmable host interface, a disk controller, a high speed host interface, a programmable disk mount, a disk monitoring unit, and a disk plug and play controller; a set of control equipment coupling the plurality of sets of RAID equipment to one another, the set of control equipment comprising a hardware host connect, an adaptive host interface controller, a host connect controller, a two-way RAID controller, a disk connect controller, and a hardware disk connect; and a set of SSD memory disk units coupled to the hardware disk connect, the set of SSD memory disk units comprising a set of volatile semiconductor memories.

A third aspect of the present invention provides a method for forming RAID controller with programmable host interface for a semiconductor storage device (SSD), comprising: providing a first set of RAID equipment comprising a first programmable host interface, first a disk controller, a first high speed host interface, a first programmable disk mount, a first disk monitoring unit, and a first disk plug and play controller; providing a second set of RAID equipment comprising a second programmable host interface, second a disk controller, a second high speed host interface, a second programmable disk mount, a second disk monitoring unit, and a second disk plug and play controller; and coupling the first set of RAID equipment to the second set of RAID equipment using a set of control equipment, the set of control equipment comprising a hardware host connect, an adaptive host interface controller, a host connect controller, a two-way RAID controller, a disk connect controller, and a hardware disk connect; and coupling a set of SSD memory disk units coupled to the hardware disk connect, the set of SSD memory disk units comprising a set of volatile semiconductor memories.

BRIEF DESCRIPTION OF THE DRAWINGS

These and other features of this invention will be more readily understood from the following detailed description of the various aspects of the invention taken in conjunction with the accompanying drawings in which.

Figure 1:
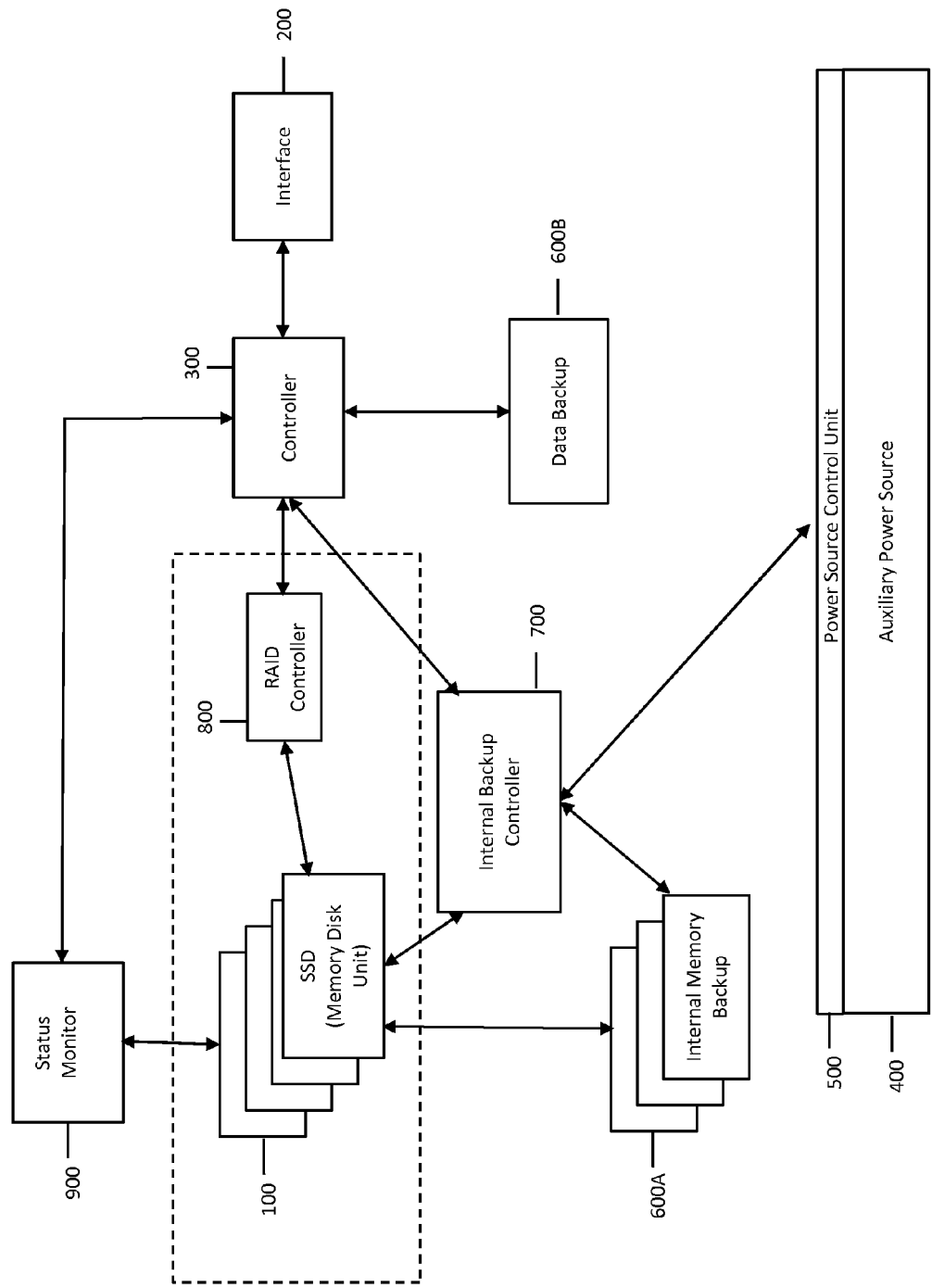
FIG. 1 is a diagram schematically illustrating a configuration of a RAID controlled storage device of a serial attached small computer system interface/serial advanced technology attachment (PCI-Express) type according to an embodiment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a serial attached small computer system interface/serial advanced technology attachment (PCI-Express) type according to an embodiment will be described in detail with reference to the accompanying drawings.

As indicated above, embodiments of the present invention provide a RAID controller for a storage device of a serial attached small computer system interface/serial advanced technology attachment (PCI-Express) type that supports a low-speed data processing speed for a host. This is typically accomplished by: adjusting a synchronization of a data signal transmitted/received between the host and a memory disk during data communications between the host and the memory disk through a PCI-Express interface; and by simultaneously supports a high-speed data processing speed for the memory disk, thereby supporting the performance of the memory to enable high-speed processing in an existing interface environment at the maximum.

Provided is a two-way RAID controlled storage device of a serial attached small computer system interface/serial advanced technology attachment (PCI-Express) type, which provides data storage/reading services through a PCI-Express interface. The RAID controller typically comprises multiple sets of RAID equipment coupled to one another via a hardware host connect, an adaptive host interface controller, a host connect controller, a two-way RAID controller, a disk connect controller, an adaptive disk mount controller, and a hardware disk connect. Coupled to the hardware disk connect are a set of DDR, SSD memory disk units. Further, each set of RAID equipment typically comprises a programmable host interface unit, a disk controller, a high speed host interface, a disk monitoring unit, a disk plug and play controllers, and a programmable disk mount.

The storage device of a serial attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment includes a memory disk unit 100 comprising a plurality of memory disks having with a plurality of volatile semiconductor memories (also referred to herein as high speed SSDs 100); a RAID controller 800 coupled to SSDs 100; a (e.g., PCI-Express host) interface unit 200 interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit, and when the power transferred from the host through the PCI-Express host interface unit is blocked or an error occurs in the power transferred from the host, receives power from the auxiliary power source unit and supplies the power to the memory disk unit through the controller unit; a backup storage unit 600 stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
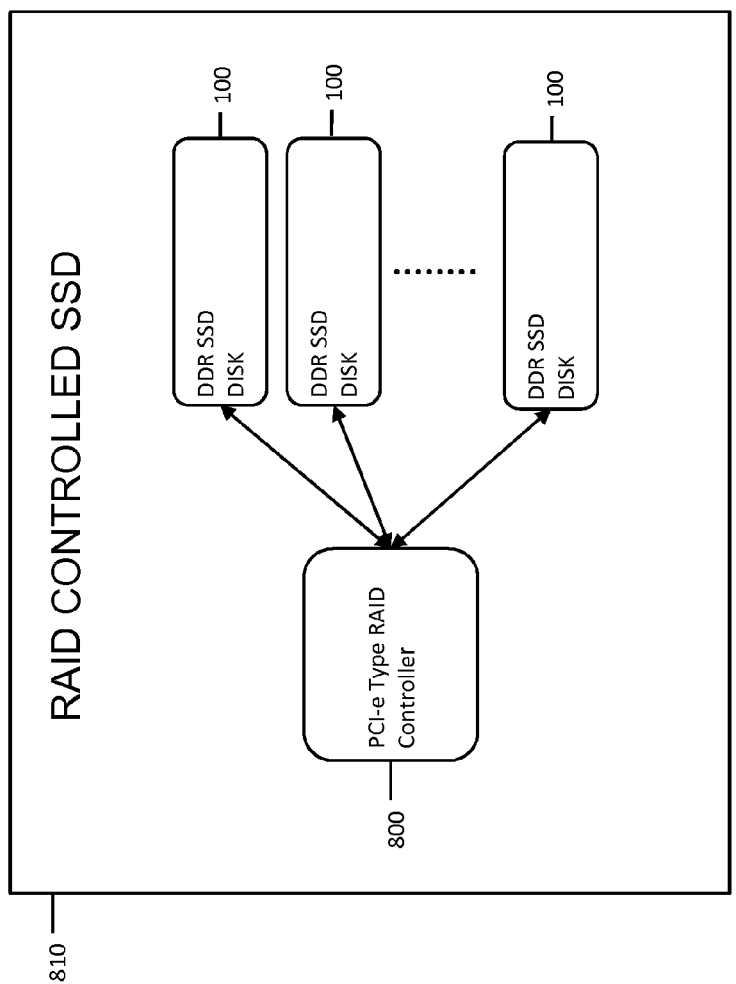
FIG. 2 is a more specific diagram of a RAID controller coupled to a set of SSDs.

Referring now to FIG. 2, a more detailed diagram of a RAID controlled SSD 810 is shown. As depicted, a PCI-e type RAID controller 800 can be directly coupled to any quantity of SSDs 100. Among other things, this allows for optimum control of SSDs 100. Among other things, the use of a RAID controller 800:
1. Supports the current backup/restore operations.
2. Provides additional and improved back up function by performing the following:
   a) The internal backup controller determines the Backup (user's request Order or the status monitor detects power supply problems);
   b) The Internal backup controller requests a data backup to SSDs;
   c) The internal backup controller requests internal backup device to backup data immediately;
   d) Monitors the status of the backup for the SSDs and Internal backup controller; and
   e) Reports the Internal backup controller's status and end-op.
3. Provides additional and improved Restore function by performing the following:
   a) The internal backup controller determines the Restore (user's request Order or the status monitor detects power supply problems);
   b) The internal backup controller requests a data restore to the SSDs;
   c) The internal backup controller requests internal backup device to restore data immediately;
   d) Monitors the status of the restore for the SSDs and Internal backup controller; and
   e) Reports the Internal backup controller status and end-op.

Figure 3:
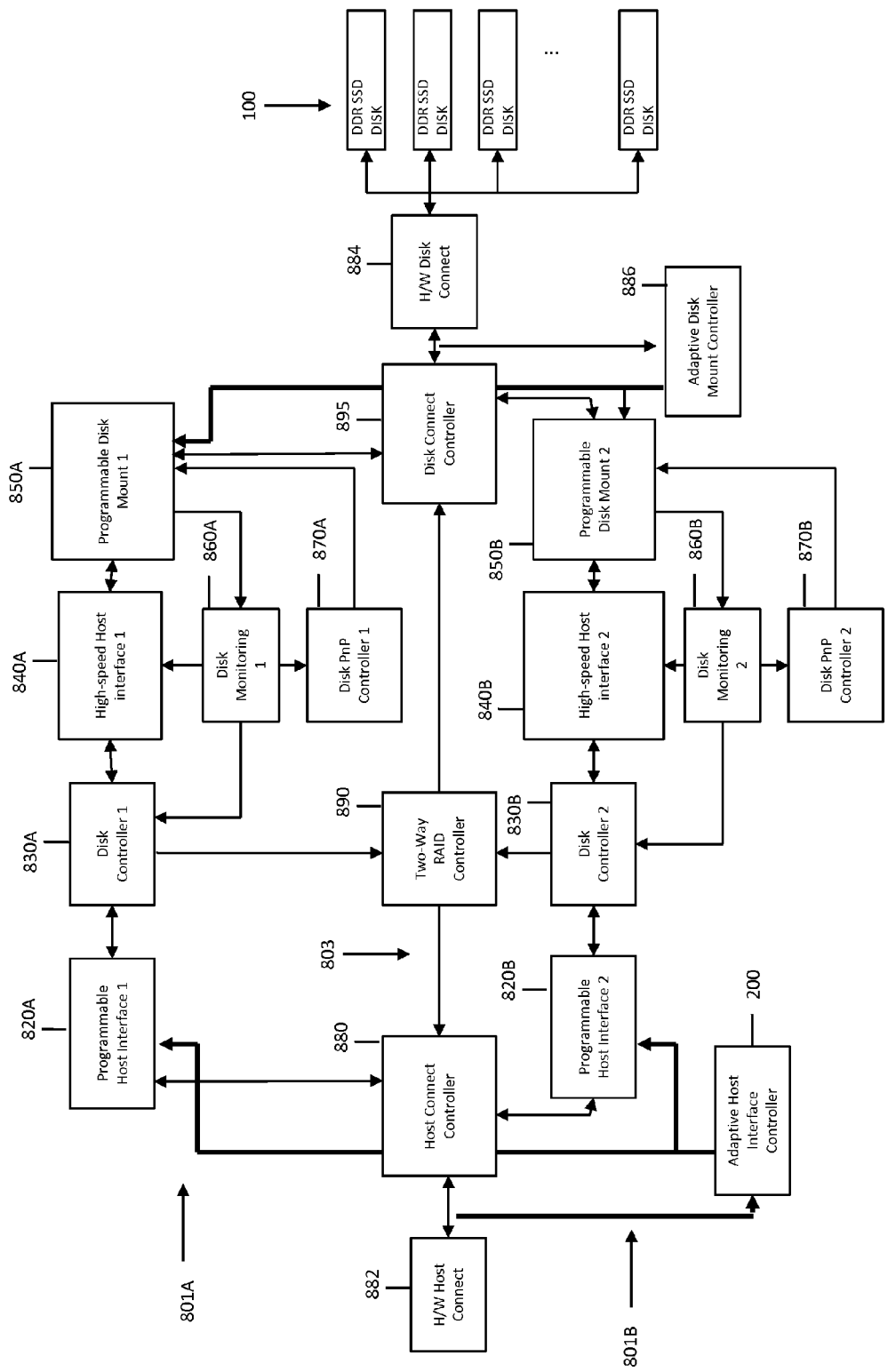
FIG. 3 is a diagram of the RAID controller of FIGS. 1 and 2.

Referring now to FIG. 3, a diagram of the RAID controller 800 of FIGS. 1 and 2 as coupled to a set (at least one) of SSD memory disk units 100 is shown in greater detail (collectively shown as unit 810 in FIG. 1). As depicted, RAID controller generally 800 comprises a first set of RAID circuitry 801A and a second set of RAID circuitry 801B that are interconnected/coupled to one another via host connect controller 880, two-way RAID controller 890, and disk connect controller 895. It is understood that although two sets of circuitry 801A-B are shown, the teachings recited herein could accommodate any quantity thereof. For example, three sets of circuitry could be provided. Two have been shown in FIG. 3 for illustrative purposes only.

Regardless, sets of RAID circuitry 801A-B include (respectively): programmable host interfaces 820A-B; disk controllers 830A-B coupled to host interfaces 820A-B A-B; and high-speed host interfaces 840A-B. Also coupled to disk controllers 830A-B are disk monitoring units 860A-B, which are coupled to programmable disk mounts 850A-B. As further shown, sets of RAID circuitry 801A-B are coupled to one another via a set of control circuitry 803 that comprises a hardware host connect unit 992, a hardware host connect controller 880, an adaptive host interface controller, a two-way RAID controller 890, a disk connect controller 895, and a hardware disk connect 884, which is coupled to set of SSD memory disk units 100.

In general, SSD memory disk units 100 are coupled to disk connect controller 895, which is coupled to disk mounts 850A -B and are detected by disk monitoring units 860A-B. Disk plug and play (PnP controllers 870A-B) control the functions and/or detection functions related to disk mounts 850A-B. In general, RAID controller 800 controls the operation of SSD memory disk units 100. This includes the detection of SSD memory disk units 100, the storage and retrieval of data there from, etc. In general, two-way RAID controller 890 analyzes the status of disk controller 830A-B and determines a appropriate data path. Host connect controller 880 controls host interfaces 820A-B. Moreover, as indicated above, disk connect controller 895 controls the link between the SSD memory disk units 100 and disk mounts 850A-B. In general, the embodiment shown in FIG. 3 provides a more stable operation between SSD memory disk units 100 and the data path, and allows for real-time selection between the two data paths provided by circuitry 801A and 801B, respectively.

Figure 4:
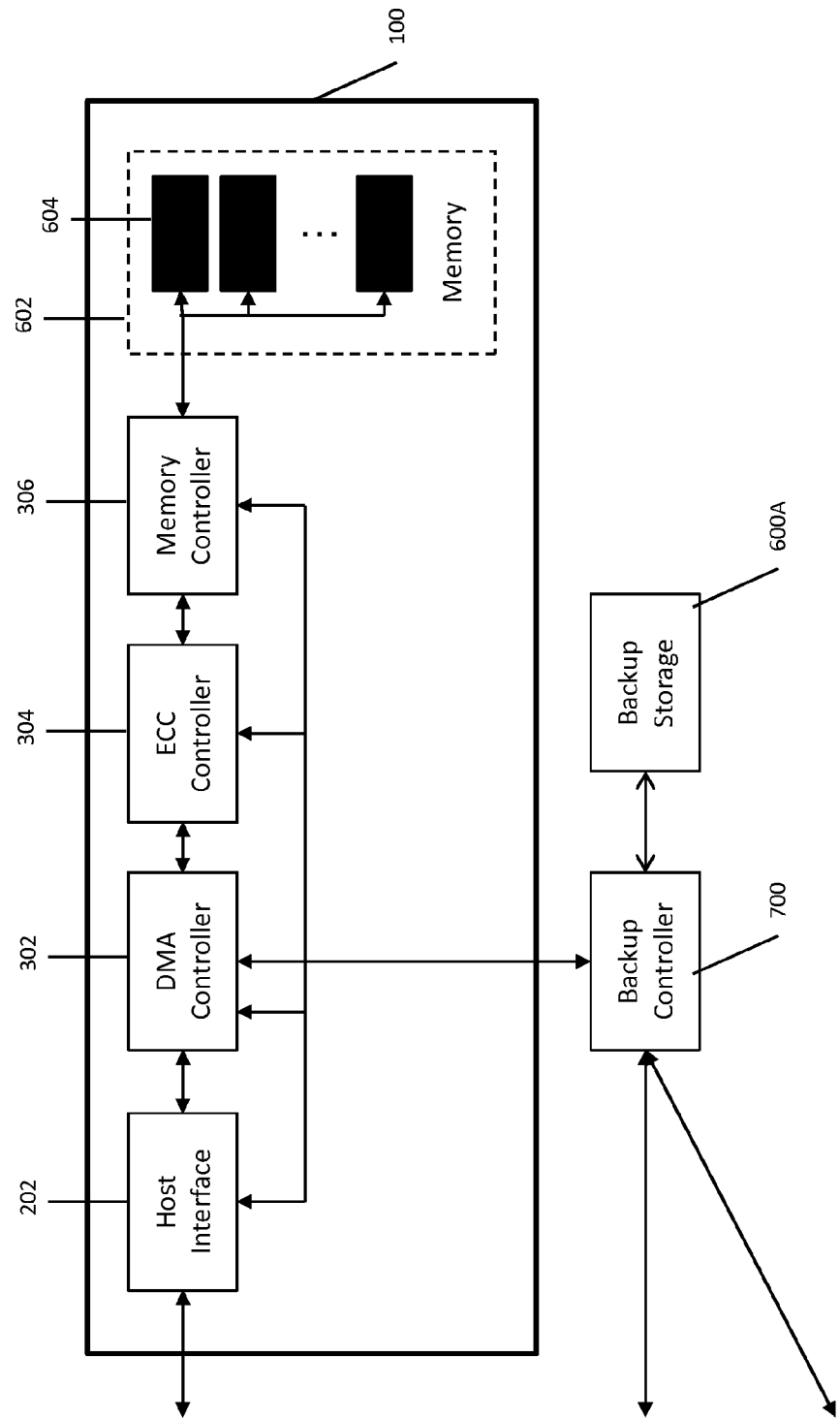
FIG. 4 is a diagram schematically illustrative a configuration of the high speed SSD of FIG. 1.

Referring now to FIG. 4, a diagram schematically illustrative a configuration of the high speed SSD 100 is shown. As depicted, SSD/memory disk unit 100 comprises a (e.g., PCI-Express host) host interface 202 (which can be interface 200 of FIG. 1, or a separate interface as shown), a DMA controller 302 interfacing with a backup control module 700, an ECC controller, and a memory controller 306 for controlling one or more blocks 604 of memory 602 that are used as high speed storage.

Figure 5:
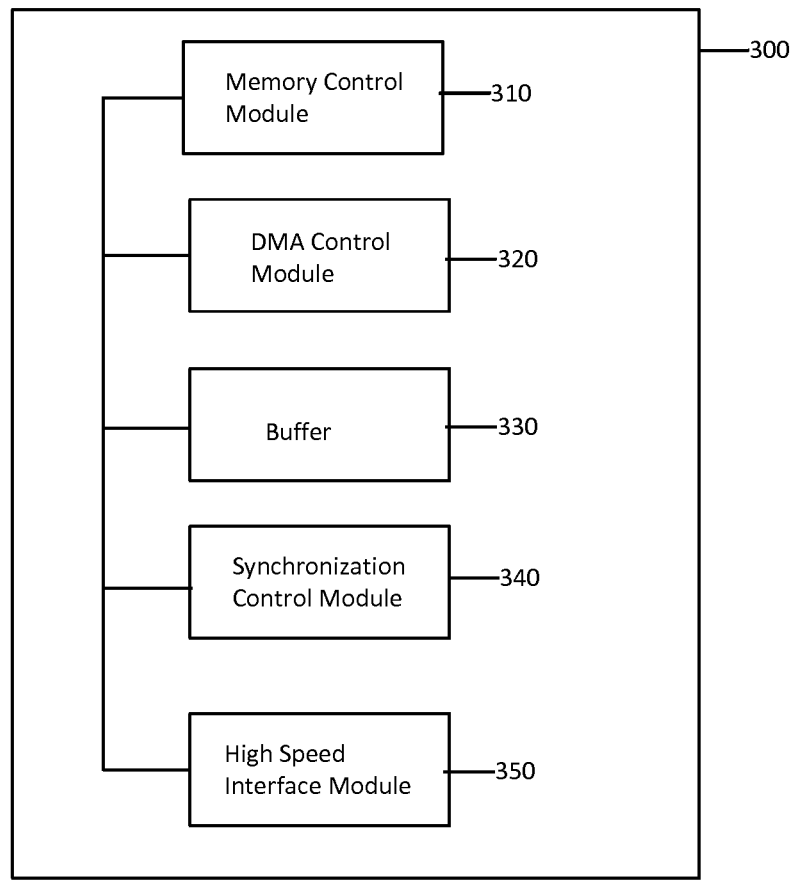
FIG. 5 is a diagram schematically illustrating a configuration of a controller unit in FIG. 1.

Referring now to FIG. 5, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low-speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A redundant array of independent disks (RAID) controller with programmable host interface for a semiconductor storage device (SSD), comprising:
    a first set of RAID equipment comprising a first programmable host interface, a first disk controller, a first high speed host interface, a first programmable disk mount, a first disk monitoring unit, and a first disk plug and play controller;
    a second set of RAID equipment comprising a second programmable host interface, a second disk controller, a second high speed host interface, a second programmable disk mount, a second disk monitoring unit, and a second disk plug and play controller; and
    a set of control equipment coupling the first set of RAID equipment to the second set of RAID equipment, the set of control equipment comprising a hardware host connect, an adaptive host interface controller, a host connect controller, a two-way RAID controller, a disk connect controller, and a hardware disk connect, wherein the two-way RAID controller is directly coupled to the host connect controller, the disk connect controller, the first disk controller and the second disk controller, respectively: and wherein the two-way RAID controller receives signals from the first disk controller and the second disk controller, analyzes status of the two disk controllers, selects a data path between a data path of the first set of RAID equipment and a data path of the second set of RAID equipment, and issues control signals to the host connect controller and the disk connect controller such that the host connect controller and the disk connect controller perform data transmission via the selected data path accordingly; and
    a set of SSD memory disk units coupled to the hardware disk connect, the set of SSD memory disk units comprising a set of volatile semiconductor memories.

2. The RAID controller of claim 1, further comprising a controller unit coupled to the RAID controller.

3. The RAID controller of claim 2, further comprising: a backup storage unit coupled to the controller which stores data of the set of SSD memory disk units; and a backup control unit coupled to the controller which backs up data stored in the set of SSD memory disk units in the backup storage unit according to an instruction from the host, or when an error occurs in the power transmitted from a host.

4. The RAID controller of claim 2, further comprising an auxiliary power source and a power control unit coupled it the backup control unit.

5. The RAID controller of claim 1, the set of S SD memory disk units comprising: a host interface unit; a direct memory access (DMA) controller coupled to the host interface unit; an error correcting code (ECC) controller coupled to the DMA controller; a memory controller coupled to the ECC controller; and a memory array coupled to the memory controller, the memory array comprising at least one memory block.

6. The RAID controller of claim 1, the set of SSD memory disk units providing storage for at least one attached computer device.

7. A redundant array of independent disks (RAID) controller with programmable host interface for a semiconductor storage device (SSD), comprising:
    a plurality of sets of RAID equipment, each of the plurality of RAID equipment comprising a programmable host interface, a disk controller, a high speed host interface, a programmable disk mount, a disk monitoring unit, and a disk plug and play controller;

a set of control equipment coupling the plurality of sets of RAID equipment to one another, the set of control equipment comprising a hardware host connect, an adaptive host interface controller, a host connect controller, a two-way RAID controller, a disk connect controller, and a hardware disk connect, wherein the two-way RAID controller is directly coupled to the host connect controller, a disk connect controller, a first disk controller of a first set of RAID equipment, and a second disk controller of a second set of RAID equipment, respectively, and wherein the two-way RAID controller receives signals from at least two disk controllers corresponding to at least two of the plurality of sets of RAID equipment, analyzes status of the at least two disk controllers, selects a data path among data paths of the plurality of sets of RAID equipment, and issues control signals to the host connect controller and the disk connect controller such that the host connect controller and the disk connect controller perform data transmission via the selected data path accordingly; and a set of SSD memory disk units coupled to the hardware disk connect, the set of SSD memory disk units comprising a set of volatile semiconductor memories.

8. The RAID controller of claim 7, further comprising a controller unit coupled to the RAID controller.

9. The RAID controller of claim 8, further comprising: a backup storage unit coupled to the controller which stores data of the set of SSD memory disk units; and a backup control unit coupled to the controller which backs up data stored in the set of SSD memory disk units in the backup storage unit according to an instruction from the host, or when an error occurs in the power transmitted from a host.

10. The RAID controller of claim 8, further comprising an auxiliary power source and a power control unit coupled it the backup control unit.

11. The RAID controller of claim 7, the set of SSD memory disk units comprising: a host interface unit; a direct memory access (DMA) controller coupled to the host interface unit; an error correcting code (ECC) controller coupled to the DMA controller; a memory controller coupled to the ECC controller; and a memory array coupled to the memory controller, the memory array comprising at least one memory block.

12. The RAID controller of claim 7, the set of S SD memory disk units providing storage for at least one attached computer device.

13. A method for forming redundant array of independent disks (RAID) controller with programmable host interface for a semiconductor storage device (SSD), comprising:

providing a first set of RAID equipment comprising a first programmable host interface, a first disk controller, a first high speed host interface, a first programmable disk mount, a first disk monitoring unit, and a first disk plug and play controller;

providing a second set of RAID equipment comprising a second programmable host interface, a second disk controller, a second high speed host interface, a second programmable disk mount, a second disk monitoring unit, and a second disk plug and play controller; and coupling the first set of RAID equipment to the second set of RAID equipment using a set of control equipment, the set of control equipment comprising a hardware host connect, an adaptive host interface controller, a host connect controller, a two-way RAID controller, a disk connect controller, and a hardware disk connect, wherein the two-way; RAID controller is directly coupled to tee host connect controller, the disk connect controller, the first disk controller, and the second disk controller, respectively, and wherein the two-way RAID controller receives signals from the first disk controller and the second disk controller, analyzes status of the two disk controllers, selects a data path between a data path of the first set of RAID equipment and a data path of the second set of RAID equipment, and issues control signals to the host connect controller and the disk connect controller such that the host connect controller and the disk connect controller perform data transmission via the selected data path accordingly; and coupling a set of SSD memory disk units coupled to the hardware disk connect, the set of SSD memory disk units comprising a set of volatile semiconductor memories.

14. The method of claim 13, further comprising coupling a controller unit to the RAID controller.

15. The method of claim 14, further comprising: coupling a backup storage unit to the controller which stores data of the set of SSD memory disk units; and coupling a backup control unit to the controller which backs up data stored in the set of SSD memory disk units in the backup storage unit according to an instruction from the host, or when an error occurs in the power transmitted from a host.

16. The method of claim 14, further comprising coupling an auxiliary power source and a power control unit to the backup control unit.

17. The method of claim 13, the set of SSD memory disk units comprising: a host interface unit; a direct memory access (DMA) controller coupled to the host interface unit; an error correcting code (ECC) controller coupled to the DMA controller; a memory controller coupled to the ECC controller; and a memory array coupled to the memory controller, the memory array comprising at least one memory block.

18. The method of claim 13, the set of SSD memory disk units providing storage for at least one attached computer device.

* * * * *